United States Patent [19]

Kondo

[11] Patent Number: 4,890,161
[45] Date of Patent: Dec. 26, 1989

[54] DECODING APPARATUS
[75] Inventor: Tetsujiro Kondo, Kanagawa, Japan
[73] Assignee: Sony Corporation, Tokyo, Japan
[21] Appl. No.: 303,272
[22] Filed: Jan. 30, 1989
[30] Foreign Application Priority Data
  May 2, 1988 [JP] Japan .................................. 63-25377
[51] Int. Cl.$^4$ ............................................ H04N 7/137
[52] U.S. Cl. ..................................... 358/135; 358/133; 358/138
[58] Field of Search ................ 358/133, 135, 136, 138
[56] References Cited
  U.S. PATENT DOCUMENTS
  4,827,337  5/1989  Yasuda ................................. 358/135

Primary Examiner—Howard W. Britton
Attorney, Agent, or Firm—Alvin Sinderbrand

[57] ABSTRACT

In a decoding apparatus for decoding data, such as a digital video signal or the like, transmitted with a smaller number of bits than that of the original datum, sample data adjacent a sample datum to be decoded are separated from the transmitted data and compared with the sample datum to be decoded, whereupon a correcting datum is generated on the basis of the compared output. The original datum is recovered from the sample datum to be decoded and the correcting datum, whereby the quantizing error or distortion can be reduced without increasing the amount of encoded data.

13 Claims, 13 Drawing Sheets

Fig.2A  Fig.2B  Fig.2C
```
 ♀   ♀   ♀      o   o   o      o   o   o
Q1  Q2  Q3      1   1   1      3   3   3
 ♀   ⌀   ♀      o   ⌀   o      o   ⌀   o
Q4  Qi  Q5      1   2   1      3   2   3
 ♀   ♀   ♀      o   o   o      o   o   o
Q6  Q7  Q8      1   1   1      3   3   3
```
Fig. 3
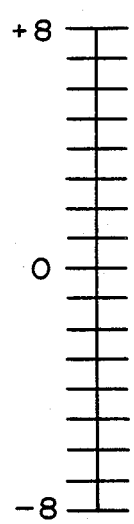
Fig. 5
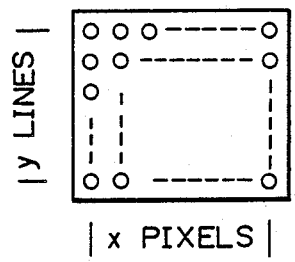

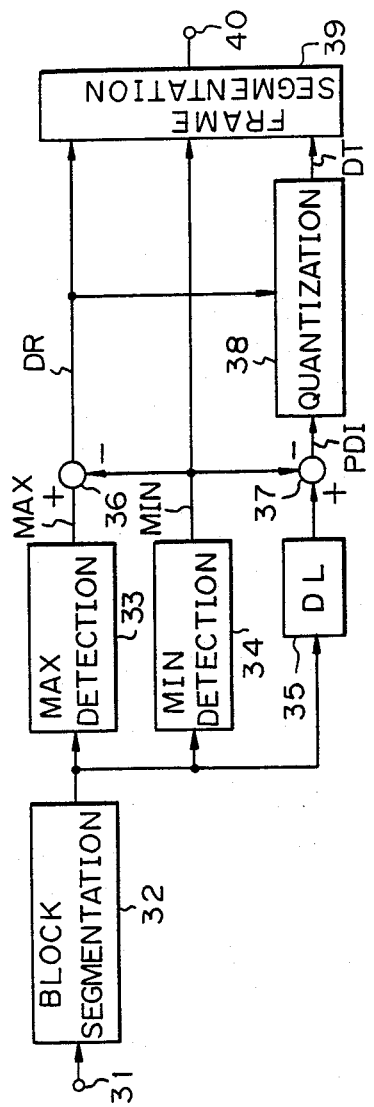
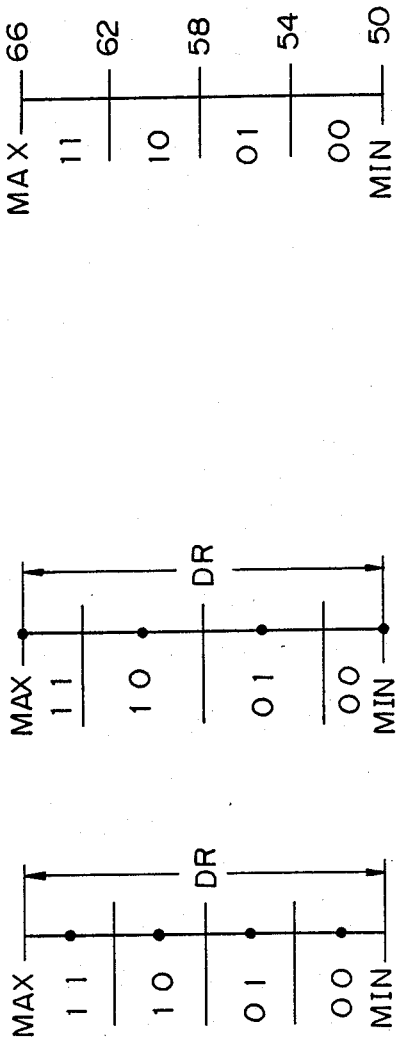

Fig. 12
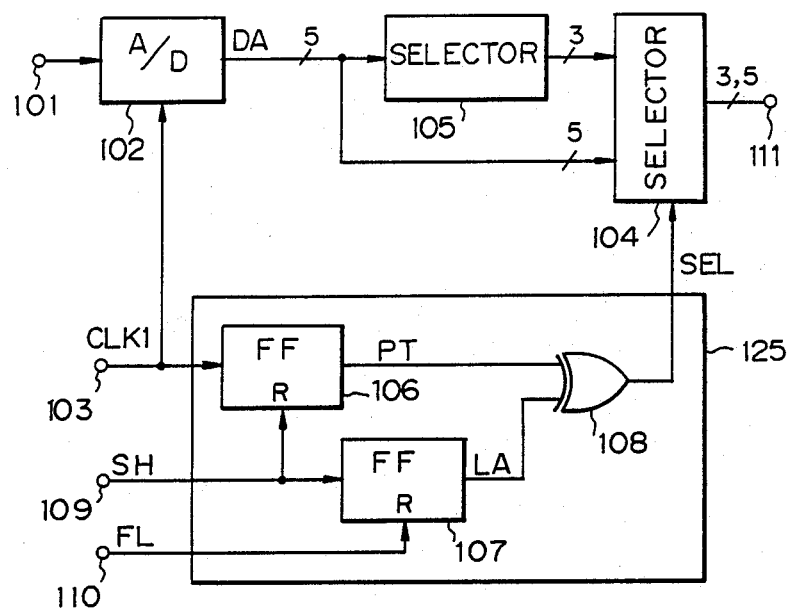
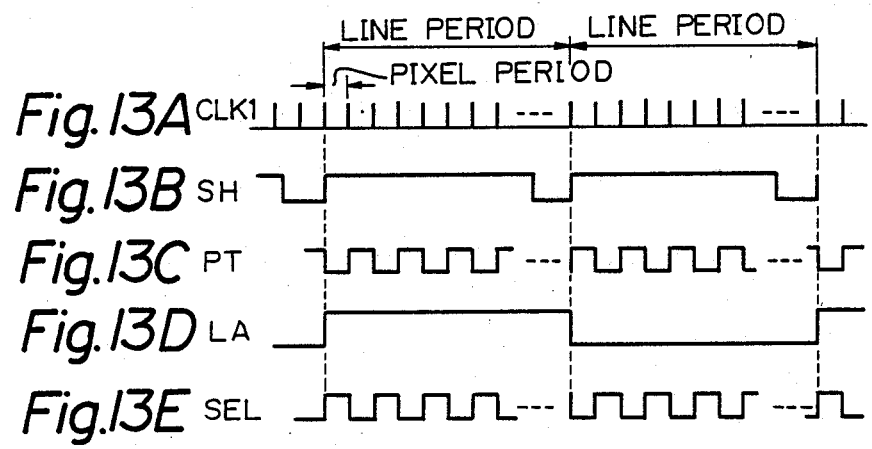
Fig. 13A CLK1
Fig. 13B SH
Fig. 13C PT
Fig. 13D LA
Fig. 13E SEL

DECODING APPARATUS

BACKGROUND OF THE INVENTION

1. Field of the Invention

The present invention relates to a decoding apparatus for receiving a transmitted image or picture signal and reproducing the original image data therefrom and, more particularly, is directed to a decoding apparatus for receiving transmitted image data which has been compression-encoded into image data of a bit number less than that of the original image data and for reproducing the original image data.

2. Description of the Prior Art

Image data are typically quantized with eight bits. To compress the data for transmission, the datum of each pixel is encoded with a bit number smaller than the original quantization bit number. For example, only the upper two bits of an eight-bit pixel datum are transmitted. On the reception side, for the encoded code of the two bits, a reproduction level is represented by the central value in each level.

The dynamic range of the original eight-bit quantization datum (i.e. 0 to 225) is divided into four parts and a 2-bit encoded code is assigned to each part as follows.

| Original Signal | Encoded Code | Decoded Value |
|---|---|---|
| 225–192 | (11) | 224 |
| 191–128 | (10) | 160 |
| 127–64 | (01) | 96 |
| 63–0 | (00) | 32 |

Since the original signal which had 256 levels, is represented by only four levels, there is a problem in that the quantization distortion is large.

In order to eliminate the above-mentioned disadvantage, the present applicant proposed an adaptive dynamic range encoding system (hereunder referred to as "ADRC system") as a compression system for a digital video signal in the level direction (MR 86-43 reported on Dec. 11, 1986 at the Institute of Electronics and Communication Engineers of Japan.

The ADRC system is an encoding system using the same strong time and spatial correlation as a television signal.

Specifically, if an image is divided, each block generally has only a small dynamic range due to local correlation. In the ADRC system, an image is divided into blocks, a dynamic range of each block is obtained, and an adaptive requantizing of a pixel datum is effected according to the dynamic range. As a result, each pixel datum is compressed into a datum with a smaller bit number than its original bit number.

Methods for dividing an image into blocks, that is, the division in the horizontal direction (one-dimensional ADRC), the division in a rectangular area in the horizontal and vertical directions (two-dimensional ADRC) and the division of a spatial area over plural frames (three-dimensional ADRC) have been proposed for example, as disclosed in Japanese Patent Application Disclosure Nos. 61-144990, 61-144989 and 62-926620, which are open to public inspection.

In the three-dimensional ADRC, movement detection between two frames is effected for every block and the data of a subsequent frame are not transmitted in a still block to perform the so-called "frame dropping". In this way, more efficient encoding can be done. In this case, a one-bit-movement-information code is needed for every block. However, in a still area, data compression of ½ can be achieved.

A system has been proposed in which the allocated bit number for every block is changed depending on the magnitude of the dynamic range of each block (hereunder called "variable-length ADRC", and which is disclosed in Japanese Patent Application Disclosure No. 61-147689 which is laid open public inspection. Furthermore, a system has been proposed in which the quantization step size is varied depending on the dynamic range of each block as a constant value less than the bit number of the original pixel datum (hereunder called "fixed-length ADRC", and also disclosed in cited Patent Application Disclosure Nos. 61-144990, 61-144989 and 62-926620.

With the above-mentioned ADRC systems, quantization distortion is reduced as compared with the system where only the upper two bits of the eight bit original quantized digital signal are selected and transmitted and an eight-bit datum is reproduced from said two-bit datum. However, in this ADRC system, quantization distortion is still apt to be present in a block with a large dynamic range, due to the decoding of the transmitted data on the decoder side.

OBJECTS AND SUMMARY OF THE INVENTION

Accordingly, it is an object of the present invention to provide a decoding apparatus which can eliminate the disadvantages of the prior art.

More specifically, it is an object of this invention to provide an improved decoding apparatus which can reduce the quantizing error or distortion.

Another object of this invention is to provide an improved decoding apparatus in which the quantizing error or distortion can be reduced without increasing the number of bits on the encoding side, that is the amount of transmitted data.

A further object of this invention is to provide an improved decoding apparatus combined with an adaptive dynamic range coding apparatus.

Still another object of this invention is to provide an improved decoding apparatus combined with a coding apparatus allowing well balanced compression in a spatial and level direction and in which the noise, due to the difference between the number of bits, can be reduced.

According to an aspect of the present invention, a decoding appartus for decoding data transmitted from a coding apparatus comprises: sample data generating means for providing sample data adjacent to the sample datum to be decoded; comparator means for comparing the sample datum to be decoded to the adjacent sample data; correcting data generating means supplied with the output of the comparator means for generating a correcting datum; and decoding means for decoding the original sample datum which is combined with the correcting datum.

According to another aspect of the present invention, a decoding apparatus as described above is provided in combination with an adaptive dynamic range coding apparatus.

The above, and other objects, features and advantages of the present invention will become apparent from the following detailed description of preferred embodiments of the invention when read in conjunction with the accompanying drawings.

BRIEF DESCRIPTION OF THE DRAWINGS

FIGS. 2A, 2B, 2C and 3 are schematic diagrams for explaining the operation of FIG. 1;

FIG. 4 is a block diagram of an adaptive dynamic range coding apparatus for explaining other embodiments of the present invention;

FIG. 5 is a schematic diagram for explaining a block which is used as a unit subjected to a coding process by the coding apparatus of FIG. 4;

FIGS. 6A and 6B are schematic diagrams for explaining the operation of the apparatus shown in FIG. 4;

FIG. 8 is a schematic diagram for explaining the operation of the embodiment of FIG. 7;

FIG. 12 is a block diagram of an improved spatial sub-sampling coding apparatus;

FIGS. 13A-13E are time charts for explaining the operation of the embodiment of FIG. 12;

In all of the FIGURES of the drawings, the same reference numerals denote the same or corresponding elements.

DETAILED DESCRIPTION OF THE INVENTION

Figure 1:
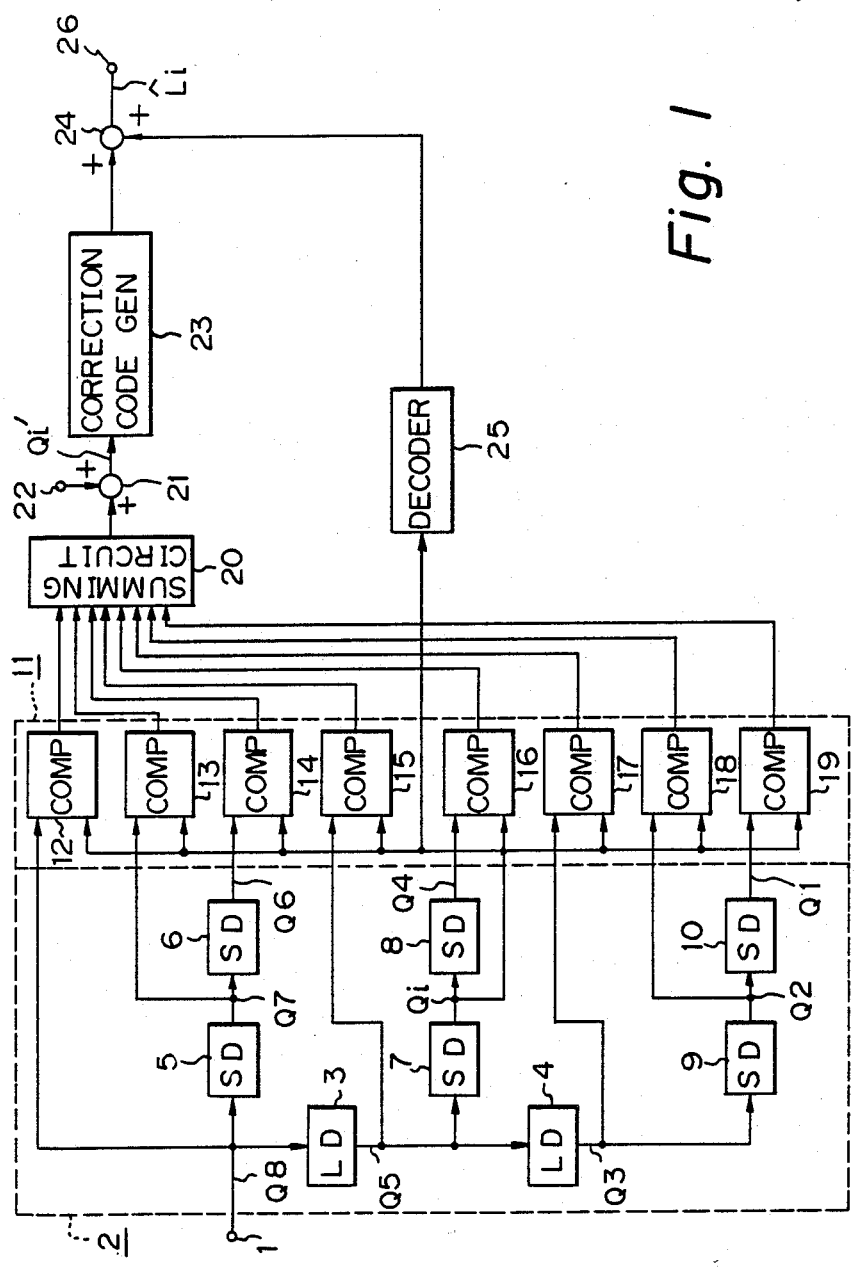
FIG. 1 is a block diagram illustrating a decoding apparatus according to an embodiment of the present invention.

Hereinafter, embodiments of the present invention will be described referring to the drawings.

In FIG. 1 a first embodiment of the invention is shown applied to the case where a two-bit quantization is carried out on the transmission side or the case where only the upper two bits of an image signal quantized with eight bits are transmitted. The invention is also applicable to bit numbers other than two bits. By way of example, the image signal may be a video signal.

Input data are applied to an input terminal 1 in the order of television scanning.

A two bit encoded code is received at the input terminal 1 and supplied to a peripheral data fetching circuit 2 (shown by a broken line) which comprises: line delay circuits 3 and 4; and sample delay circuits 5, 6, 7, 8, 9 and 10 connected to input terminal 1 and the output terminals of the line delay circuits 3 and 4.

Circuit 2 simultaneously fetches an encoded code $Q_i$ of an objection pixel, indicated by a shaded dot, and encoded codes $Q_1$ to $Q_8$ of eight peripheral pixels of the objective pixel as shown in FIG. 2A. In other words, when the encoded code $Q_8$ is supplied to input terminal 1, code $Q_5$ is outputted from line delay circuit 3, code $Q_3$ is outputted from line delay circuit 4, codes $Q_7$ and $Q_6$ are outputted from sample delay circuits 5 and 6, respectively, codes $Q_1$ and $Q_4$ are outputted from sample delay circuits 7 and 8, respectively and codes $Q_2$ and $Q_1$ are outputted from sample delay circuits 9 and 10, respectively.

The output data from peripheral data fetching circuit 2 are supplied to comparison circuit 11 (shown by broken line) which comprises eight comparators 12 to 19. In other words, the encoded codes $Q_8$ to $Q_1$ of the peripheral pixels from fetching circuit 2 are supplied to the comparators 12 to 19, respectively, and the encoded code $Q_i$ of the objective pixel is also commonly supplied to each of the comparators 12 to 19.

The comparators 12 to 19 compare the encoded code $Q_1$, of the objective pixel, with the encoded codes $Q_j$ (j=1, 2, ..., 8) of the peripheral pixels and generate the following comparison outputs:

when $Q_j > Q_i$: +1
when $Q_j = Q_i$: 0
when $Q_j < Q_i$: −1

The output signals of comparison circuit 11 are supplied to summing circuit 20 wherein their outputs are added. For instance, as shown in FIG. 2B, when the encoded code $Q_i$ is 2=(10) and all of the codes $Q_1$ to $Q_8$ are 1=(01), the total value of summing circuit 20 becomes −8. On the other hand, as shown in FIG. 2C, when encoded code Qi is 2=(10) and all of the codes $Q_1$ to $Q_8$ are 3=(11), the total value of the circuit 20 becomes +8. Therefore, when the encoded code $Q_1$ equals 2=(10), there are seventeen possible summing values (i.e. between −8 and +8) as shown in FIG. 3. However, when $Q_1 = 3 = (11)$, there are only nine possible summing values (i.e. between 0 and −8). Likewise, when $Q_1$ is 0=(00), there are also nine possible summing values (i.e. between 0 and +8). Therefore, the total number of possible summing values is 52 for all possible values of the encoded code $Q_1$ of the objective pixel.

The output signal of summing circuit 20 is supplied to adder 21. The datum of +8 is supplied from terminal 22 to adder 21. Therefore, the total values from summing circuit 20 (i.e. −8 to +8) are converted into 0 to 16, respectively, by adder 21. The output signal $Q_i'$ of adder 21 is supplied to correction code generator 23 wherein a correction code is formed and supplied to adder 24. The decoded datum of encoded data $Q_i$ of the objective pixel is supplied from decoder 25 to adder 24 thereby producing a decoded value $\hat{L}_i$ which is fed to output terminal 24 of adder 24.

When the number of bits is two, the decoder 25 is a ROM (read-only memory) or a multiplying circuit which performs the decoding by using the process of $256/2^2 \times Q_i$. Therefore, the output value of the decoder 25 is set at 0, 64, 128, 192. Correction code generator 23 is a ROM or an arithmetic circuit which generates a correction code from output signal $Q_i'$ of adder 21 by the following process:

$$\left[ \frac{256 \times (Q_i' + 0.5)}{2^2 \times 17} + 0.5 \right]$$

From the value of the above equation, the correction code of an integer is generated by a discarding process. When the total value at the output of summing circuit 20 becomes $+8$ (as shown in FIG. 2C), the output $Q_i'$ of adder 21 is set to $+16$, and the correction code generator 23 generates a correction code value of 62. Thus, decoded value $\hat{L}_i$ obtained from adder 24 is 190 (i.e. $128+62=190$). As shown in FIG. 2B, when the total value at the output of summing circuit 20 becomes $-8$, the output $Q_i'$ of adder 21 is 0 and correction code generator 23 generates a correction code value of 2. Thus, the decoded value $\hat{L}_i$ which is derived from adder 24 is set to 130 (i.e. $128+2=130$).

In the prior art, the level is represented merely by a central value (i.e., 160 for the above example). In accordance with the present invention, the level is converted into 17 fine reconstruction levels $\hat{L}_i$ which are determined by the values of the encoded codes of the peripheral pixels as shown in the foregoing example. Thus, the quantization distortion is reduced.

The present invention can also be applied to decoding of adaptive dynamic range coding (hereinafter ADRC) in which a picture plane is divided into a number of blocks (two-dimensional regions) and the quantization is executed so as to be adaptive to the dynamic range of each block.

Figure 7:
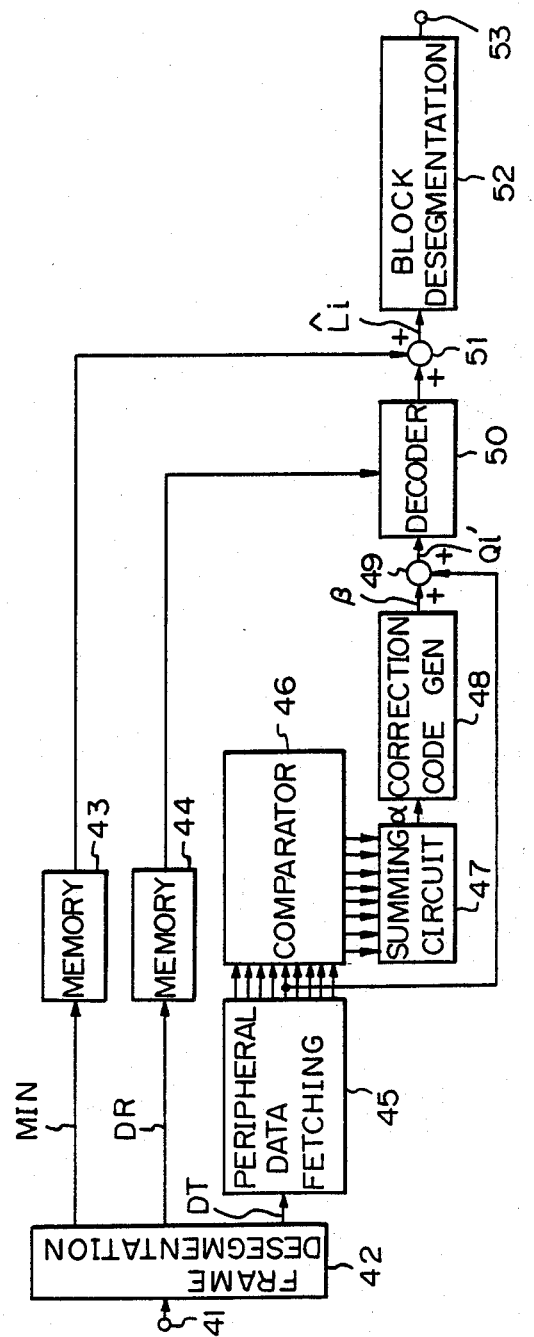
FIG. 7 is a block diagram illustrating a decoding apparatus according to a second embodiment of the present invention.

In a second embodiment shown in FIG. 7, the invention is applied to the decoding of data encoded according to ADRC in which a video signal is converted into the construction of a two-dimensional block and quantized with two bits in a manner adaptive to the dynamic range of each block, for example, by a coding apparatus of the type shown on FIG. 4.

More particularly in FIG. 4, a digital video signal supplied to input terminal 31 is fed to block segmentation circuit 32 wherein the order of the television scanning is converted into block order. One block has a two-dimensional area (x pixels x y lines) as shown in FIG. 5. The output signal of block segmentation circuit 32 is fed to maximum value detector 33 for detecting a maximum value (MAX) for every block, minimum value detector 34 for detecting a minimum value (MIN) for every block and delay circuit 35.

The detected maximum value MAX and minimum value MIN are supplied to subtraction circuit 36. A dynamic range (DR), which is a difference between the MAX and the MIN values, is produced from circuit 36. The delay circuit 35 delays the data for the period of time necessary for detecting the MAX and the MIN values. The MIN value is subtracted from the video data at a subtraction circuit 37 so as to provide a datum PDI which is fed to quantization circuit 38. The detected dynamic range (DR) is also supplied to the circuit 38, which performs a quantization adaptive to the DR thereby generating a two-bit encoded code DT. The quantization circuit 38 is composed of a ROM or an arithmetic circuit.

In circuit 38, the dynamic range (DR) is divided as shown in FIG. 6A (i.e. $2^2=4$), and the two-bit encoded code DT corresponds to the level range containing the datum PDI (with the minimum value subtracted). In the prior art decoding method of ADRC, the central value of each level range is decoded as a representative level. The encoding processing shown in FIG. 6A is indicated by the following equation in which $Q_i$ is the value of an encoded code DT corresponding to an original level $L_i$:

$$Q_i = \left[ \frac{(L_i - \text{MIN}) \times 2^n}{DR} \right]$$

The above processing, called a "non-edge matching system", creates an integer by omitting fractions.

The quantization may also be affected by a prior art method in which the maximum value MAX and the minimum value MIN are provided as decoded representative levels, as shown in FIG. 6B. This is called an "edge matching system".

An additional code consisting of the dynamic range DR, the value MIN, and the encoded code DT is fed to frame segmentation circuit 39, which performs encoding for error correction and the addition of a synchronization signal. The transmission data are produced at output terminal 40 of the frame segmentation circuit 39.

FIG. 7 shows an embodiment of the present invention applied to the decoding of the above-mentioned data. The received transmission data supplied at input terminal 41 are fed to a frame desegmentation or separation circuit 42 which performs the decoding of the error correction code and the minimum value MIN, the dynamic range DR, and the encoded code DT separately. The MIN and DR are supplied to memories 43 and 44, respectively.

The encoded code DT is supplied to peripheral data fetching circuit 45 so that encoded codes of plural, for example, eight peripheral pixels adjacent an objective pixel can be taken out. The circuit 45 fetches the encoded code $Q_i$ of the objective pixel (shown by a shaded dot in FIG. 2A) and the encoded codes to $Q_8$ of the eight peripheral pixels simultaneously. The peripheral data fetching circuit 45 also has a memory for the simultaneous fetching of the encoded codes of the peripheral pixels. The data of pixels in the same block as the objective pixel are taken out as peripheral data. In the case where the objective pixel is at one end of a block, the encoded data of peripheral pixels lying within the same block are interpolated since some of the peripheral pixels are contained in another block.

Output data from the circuit 45 are supplied to comparator 46, which is similar to the circuit 11 on FIG. 1 and which comprises eight comparison circuits (not shown). The encoded codes $Q_i$ to $Q_8$ from circuit 45 and the encoded code $Q_i$ are respectively supplied to the comparison circuits of the comparator 46. Each of these comparison circuits generates the following comparison output by comparing the code $Q_i$ and the code $Q_j$ (j=1, 2, - - - , 8):

$Q_j > Q_i$: $+1$
$Q_j = Q_i$: 0
$Q_j < Q_i$: $-1$

The output signals of the comparator 46 are fed to summing circuit 46, wherein the comparison outputs are added together to form a sum $\alpha$. For example, as shown in FIG. 2B, when the encoded code $Q_i$ is $2=(10)$ and each of the $Q_1$ to $Q_8$ is $1=(01)$ the sum $\alpha$ of circuit 47 is $-8$. Also, when the code $Q_i$ is $2=(10)$ and each of the $Q_1$ to $Q_8$ is 3=(11) (as shown in FIG. 2C), the sum $\alpha$ of the summing circuit 47 is +8. Therefore, the sum $\alpha$ has 17 possible values ranging from −8 to +8.

The output signal $\alpha$, from circuit 47, is supplied to correction code generator 48, which is composed of a ROM, for performing division thereby producing correction code $\beta$ (i.e. $\beta = \alpha/17$). The output of generator 48 (i.e. correction code $\beta$) is fed to adder 49 and added to the encoded code $Q_i$ of the objective pixel.

The output signal $Q_i'$ of the adder 49 is fed to decoder 50 where the dynamic range DR from memory 44 has been supplied. Decoder 50 provides a decoded level which is dependent upon the output signal $Q_i'$ of adder 49 and which is supplied to an adder 51 wherein the output signal of decoder 50 and minimum value MIN from memory 43 are added together.

The decoded level of the objective pixel (which has level distinction than in the prior art) is obtained from the adder 51. The output signal of adder 51 is supplied to a block desegmentation or separation circuit 52 wherein the order of blocks is converted into that of television scanning and is derived at output terminal 53.

The decoding process in the above-mentioned second embodiment is represented by the following equation:

$$Q_i' = Q_i + \beta = Q_i + (\alpha/17)$$

$$\hat{L}_i = \left[ \frac{DR \times (Q_i' + 0.5)}{2^2} + MIN \right]$$

In a prior art decoding process, the received encoded data $Q_i$ is employed in the above equation in place of the combined signal $Q_i'$ from the adder 49.

As an example, if it is assumed that the original level of the objective pixel is represented by $L_i=61$ in a block with MIN=50 and MAX=66 as shown in FIG. 8, the encoding is performed as follows:

$$Q_i = \left[ \frac{(61 - 50) \times 2^2}{16} \right] = 2$$

According to the prior art decoding process, the encoded code $Q_i$ is decoded as follows:

$$\hat{L}_i = \left[ \frac{16 \times (2 + 0.5)}{2^2} + 50 \right] = 60$$

According to the present invention, in the case of ($\alpha = +8$) the decoding is as follows:

$$Q_i' = 2 + (8/17) \approx 2.47$$

$$\hat{L}_i = \left[ \frac{16 \times (2.47 + 0.5)}{2^2} + 50 \right] = 61$$

Further, in the case of ($\alpha = -8$), the decoding is performed as $$Q_i' = 2 + (-8/17) \approx 1.53$$

$$\hat{L}_i = \left[ \frac{16 \times (1.53 + 0.5)}{2^2} + 50 \right] = 58$$

Therefore, the decoded level $L_i$ according to the present invention has finer steps than in the prior art.

Figure 9:
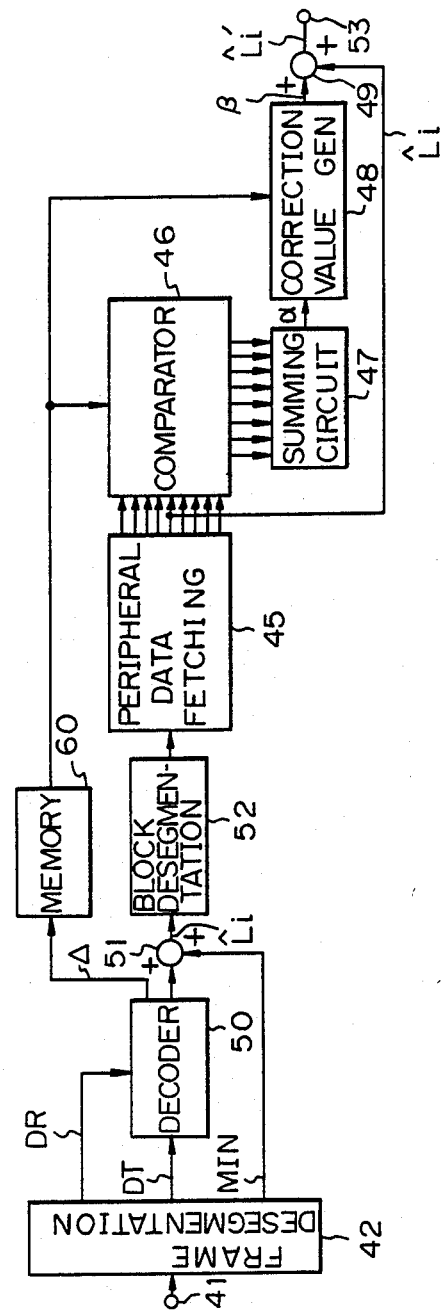
FIG. 9 is a block diagram illustrating a decoding apparatus according to a third embodiment of the present invention.

In the second embodiment, the decoding is carried out by referring only to pixels in the same block, even when decoding a pixel which is at one end of a block (wherein the peripheral pixels are in other blocks). However, by limiting the decoding only to pixels in the same block, the correct decoding of the pixel which is located at one end of the block, cannot be done. In a third embodiment (as shown in FIG. 9), adaptive decoding is effected with reference to pixels which may be present in other blocks of the decoding operation.

The received data is again supplied through the input terminal 41 to the frame desegmentation circuit 42 wherein the decoding of the error correction code is performed. The minimum value MIN, the dynamic range DR, and the encoded code DT are produced separately in the frame desegmentation circuit 42.

The code DT and the dynamic range DR from the circuit 42 are supplied to the decoder 50. The output signal of the decoder 50 is fed to the adder 51. A decoded level $\hat{L}_i$ (decoder value) of a pixel produced at the output of the adder 51 is given by the following equation:

$$\hat{L}_i = \left[ \frac{DR \times (Q_i + 0.5)}{2^2} \right] + MIN$$

Although the decoding can be completed by the above-described ADRC processing according to the prior art, in this embodiment, a block desegmentation and a conversion into the television scanning order are performed, a spatial feature is extracted from the relationship between the decoded value of the objective pixel and its peripheral pixels, and an adaptive decoding is carried out.

A decoding value produced at the output of the adder 51 is supplied to the block desegmentation circuit 52 wherein data arranged in the order of blocks is converted into the order of TV scanning and outputting to peripheral data fetching circuit 45. In circuit 45, decoded values of plural peripheral pixels, for example, eight peripheral pixels around the objective pixel are taken out. In other words, the circuit 45 takes out decoded values $\hat{L}_i$ of the objective pixel (indicated by the shaded dot in FIG. 2A) and simultaneously decoded values $\hat{L}_1$ to $\hat{L}_8$ of the eight peripheral pixels surrounding the objective pixel. In order to accomplish this, the peripheral data fetching circuit 45 is constructed with a memory or a line-delay circuit and a sample delay circuit (not shown).

Output data from circuit 45 are supplied to comparator 46. A quantization step $\Delta(=DR/2^2)$ of each block is generated by the decoder 50 and is supplied to comparator 46 from a memory 60. The comparator 46 comprises eight comparison circuits (not shown) each of which is supplied with one of the decoded values $\hat{L}_1$ to $\hat{L}_8$ of the peripheral pixels from circuit 45 and the result of addition of the decoded value $\hat{L}_i$ of the objective pixel and $\frac{1}{2}\Delta$. Each comparison circuit compares the sum of $\hat{L}_i + \frac{1}{2}\Delta$ and each decoded value $\hat{L}_j$ (j=1,2, ..., 8) of the peripheral pixels to produce the following comparison outputs.

$L_j > L_i + \frac{1}{2}\Delta$: +1
$L_j = L_i + \frac{1}{2}\Delta$: 0
$L_j < L_i + \frac{1}{2}\Delta$: −1

When a pixel of a peripheral block is used as a reference pixel of the present block, the addition/subtraction of $\frac{1}{2}\Delta$ is performed since it is equivalent to the requantization of the peripheral pixel based on the dynamic range of the present block and the minimum value.

The output of comparator 46 is supplied to summing circuit 47 wherein the comparison outputs are added together to form a sum $\alpha$ which has 17 possible values ranging from $-8$ to $+8$.

The output signal $\alpha$, from circuit 47, and the quantization step $\Delta$ from the memory circuit 60 are supplied to the correction code generator 48. The generator 48 is composed of a ROM or an arithmetic circuit for performing division thereby producing correction value $\beta$ {i.e. $\beta = (\alpha \times \Delta) \div 17$}. The output of generator 48 (i.e. correction value $\beta$) is fed to adder 49 and added to the decoded value objective pixel. The output signal $\hat{L}_i'$ of adder 49 is taken out from output terminal 53 as a decoded output. The output signal $\hat{L}_i'$ with the correction value $\beta$ added has finer steps than those of a decoded value $\hat{L}_i$ produced from the decoder 50.

The ADRC system shown in each of the above-mentioned embodiments is intended for the compression in the level direction. There is a technique called "intra-frame sub-sampling" for providing better compression in combination with the ADRC system. The intra-frame sub-sampling" technique is a system for thinning out pixel data periodically, for instance, in a line-quincunx fashion, to attain compression in the spatial direction. As a result, this sub-sampling enables well-balanced compression in combination with the compression in the level direction by the ADRC system.

Figure 10:
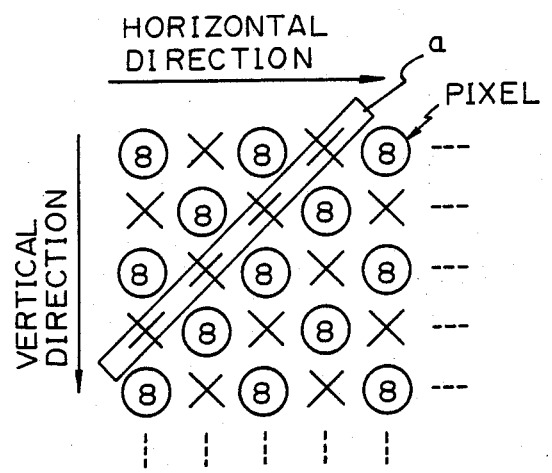
FIG. 10 is a schematic diagram for explaining the principle of a spatial sub-sampling method.

An example of the intra-frame sub-sampling is shown in FIG. 10.

As shown in FIG. 10 pixel data indicated at x are thinned out by a method in which a pixel datum is transmitted for every other pixel position in the horizontal and vertical direction (as indicated by 0). With this method when one pixel is represented by eight bits, the transmission data can be compressed to $\frac{1}{2}$ because it is equivalent to the case where all pixels are transmitted with four bits.

In this case, the thinned-out pixel data (indicated by X) are reproduced by interpolation using the pixel data shown at 0 and which are adjacent, in the right-handed and left-handed directions, to each pixel datum indicated by X, and the pixel data shown at 0 and which are adjacent, in the upper and lower directions to the pixel datum indicated by x, because the transmitted pixel data indicated by 0 are in a line-quincunx fashion.

Figures 11A, 11B:
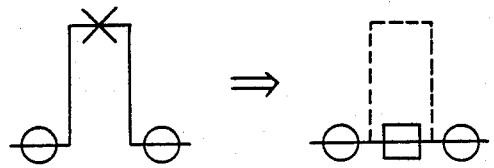
FIGS. 11A and 11B are schematic diagrams for explaining the defects of the spatial sub-sampling method.

When correlation exists between the pixel datum lying at the X position and the pixel data positioned relative thereto in the upper, lower, left-handed and right-handed directions (in the case of the above-stated sub-sampling in the frame), the interpolation to obtain the X position produces excellent results. In the absence of said correlation, the pixel datum at the X position cannot be reproduced by such interpolation. More specifically, reference to FIG. 11A will show that, when a video signal gives an abrupt level change (as indicated by a solid line) and there is no correlation between the pixel data at the X and 0 positions, the pixel data produced by interpolation assumes the level shown as □ in FIG. 11B, since information on the pixel data at the X positions does not exist. Consequently, the pixel data at the X positions cannot be reproduced. This means that pixels lying on a line and consisting only of pixel data at the X positions (as shown by a solid line in FIG. 10) cannot be reproduced.

This is because the X position pixel data information in the level direction disappears due to the lack of balance in this direction as a result of the thinning out of the pixel data at the X positions upon space compression based on the spatial sampling.

As a means to correct this deficiency, the inventor of the present application has proposed a novel transmission apparatus capable of performing well-balanced compression (refer to Japanese Patent Application No. 63-43363).

FIG. 12 shows an example of such transmission apparatus and FIG. 13 shows a timing chart to which reference will be made in describing operation of the transmission apparatus.

Referring to FIG. 12, a video signal supplied to an input terminal 101 is fed to an A/D (analog to digital) converter 102 and sampled by a clock CLK1 (FIG. 13A) fed via a terminal 103 whereby the sampled value is converted to a five-bit datum (pixel datum). The five-bit pixel datum DA from the A/D converter 102 is directly supplied to one input terminal of a selector 104 and a selector 105 wherein the upper three bits are selected. Consequently, only the upper three bits of said datum DA are fed to another input terminal of the selector 104. A selector signal SEL is supplied from a selection signal generator 125 to the selector 104. A pixel datum is produced from selector 104 so that a five-bit datum and a three-bit datum are obtained alternately in the horizontal and vertical directions for transmission from an output terminal 111.

Figure 14:
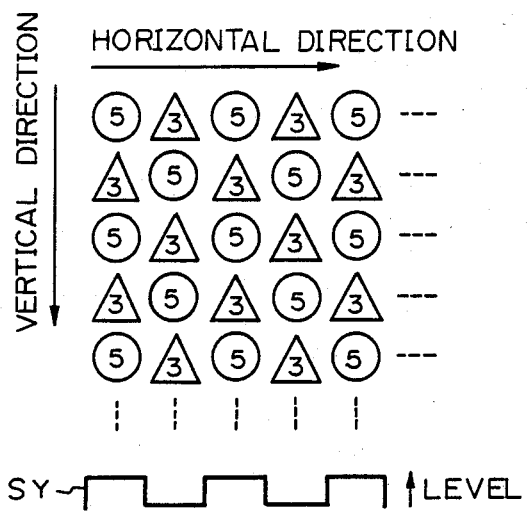
FIG. 14 is a schematic diagram for explaining the operation of the improved spatial sub-sampling method.

The diagram in FIG. 14 illustrates output pixel data wherein five-bit pixel data are indicated at 0 and three-bit pixel data are indicated at $\Delta$. It is to be noted that the pixels lying in the line-quincunx fashion have the same bit number.

Referring to FIG. 12, it will be seen that the selection signal generator 125 is constructed of flip-flops 106 and 107, and an exclusive OR circuit 108. The flip-flop 106 is triggered by the clock CLK1 from terminal 103 and is reset by a signal SH (FIG. 13B) which is in synchronism with the video signal fed through a terminal 109. A signal PT is produced (FIG. 13C), which has a period twice the period of the clock CLK1 and is reset at the beginning of a horizontal interval, and which is supplied to the Exclusive OR circuit 108.

The flip-flop 107 is triggered by the signal SH and reset by a signal FL with a field period, which is supplied via a terminal 110. As a result, a signal whose state is inverted in every horizontal interval (FIG. 13D) is produced by the flip-flop 107 and supplied to the exclusive OR circuit 108. Therefore, selection signal SEL (FIG. 13E) is obtained in which the signal PT with its original and inverted phase appear in alternate horizontal intervals.

For example, if a five-bit pixel datum is provided from the selector 104 when "1" is presented by the selection signal SEL and a three-bit pixel datum is provided by selector 104 in the absence of "1" from the selection signal SEL, transmission data of an array of five-bit pixel data and three-bit pixel data in a line-quincunx fashion (as shown in FIG. 14) are provided at output terminal 111.

Figure 15:
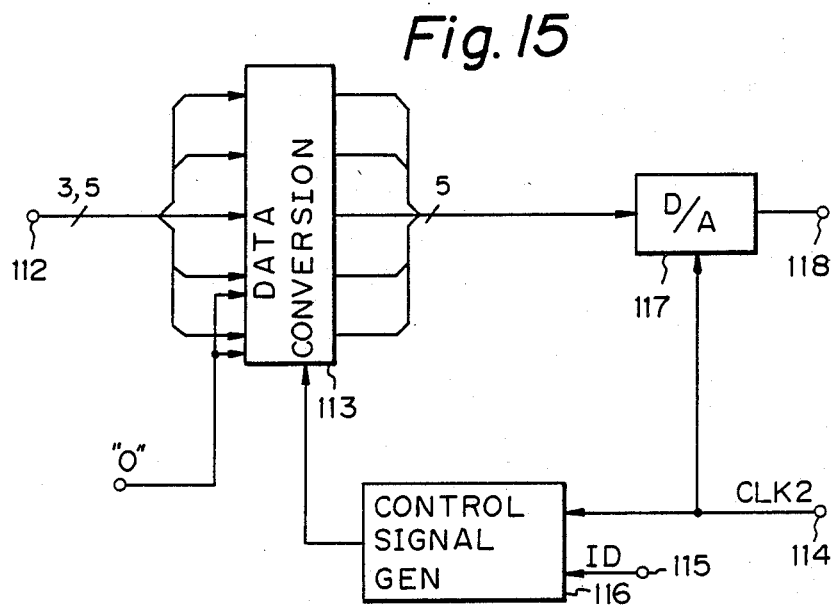
FIG. 15 is a block diagram of a decoding apparatus for decoding data transmitted from the coding apparatus of FIG. 12.

At the decoding apparatus shown in FIG. 15, a three-bit or five-bit datum is supplied to a converter 113, which is composed of a shift register and its peripheral circuits. In the decoding apparatus, a clock CLK2, with a pixel period, is supplied to a conversion control signal generator 116 through a terminal 114, and a signal ID, indicative of the rotary head position and having a period of a horizontal interval or a field, is supplied to the generator 116 through a terminal 115.

In the transmission of a digital video signal, no horizontal or vertical synchronization signal is sent. However, since the number of pixel samples per horizontal line is dependent on the sampling frequency, the commencement of the data of a horizontal line can be discrimiated to provide the signal ID. Further, by keeping the signal ID and the clock CLK 2 at a constant phase relationship, the clock CLK2 can be synchronized with a pixel datum.

It is to be noted that the signal ID, used for discriminating the horizontal interval, field, etc., may be sent with the data.

A conversion control signal corresponding to the selection signal SEL at the transmission side is developed in the decoding apparatus on the basis of the signal ID and the clock CLK2.

In the converter 113, when a pixel datum has five bits, the five-bit datum is directly outputted to a D/A converter 117 by said conversion control signal. Also, when the pixel datum has three bits, the three-bit datum is shifted so that this datum occupies the upper three bits of the five-bit shift register and "0's" are added to the lower two bits thereby providing a total of five bits. This five-bit datum is outputted to the D/A converter 117. The clock CLK2 is supplied to the D/A converter 117, and the five-bit pixel datum is converted to an analog signal so that a demodulated video signal is produced at an output terminal 118.

Since a pixel dataum is sent with either five or three bits (as in the case of FIG. 12), this is equivalent to the case where all the pixel data are sent with four bits when viewed on a picture spatially integrated and is almost equivalent to the case where the eight-bit pixel data (as in the prior art shown in FIG. 10) are transmitted by thinning out in the line-quincunx fashion.

However, the prior art example of FIG. 10 produces defects in the reproduced picture because there are pixels for which no data at all is transmitted due to the compression in the spatial direction.

In contrast, in the apparatus of FIG. 12, pixel data are sent securely in the above-mentioned transmission apparatus regardless of the compression in the spatial direction, and also in the level direction. Consequently, the apparatus enables well-balanced compression thereby eliminating the disadvantage in the prior art example.

In a fourth embodiment, the present invention is applied to a reception apparatus for receiving transmission data from a transmission apparatus based on the combination of the above-described encoding system and the ADRC system.

This transmission apparatus will be explained by first referring to FIG. 16.

A picture signal from an input terminal 141 is supplied to an A/D converter 142, wherein each pixel is converted into a datum by a clock signal CLK1 from a terminal 143. The datum is supplied to a block segmentation circuit 144 and divided into blocks, for example, into two-dimensional small blocks of 3 lines ×6 pixels. Data from each block are fed to a minimum value/maximum value detector 145 to obtain a maximum value MAX and a minimum vale MIN in each block.

Data from each block in block segmentation circuit 144 are supplied to subtraction circuit 147 through a delay circuit 146 for delaying for a period of time corresponding to a delay time in the detector 145. The minimum value MIN in that block is applied to the subtraction circuit 147. The minimum value MIN is subtracted from each pixel datum in said block to produce a difference datum ΔDATA/ TJe ΔDATA is fed to an adaptive encoder 148. This encoder 148 corresponds to the quantization circuit 38 referred to in respect to FIG. 4.

Meanwhile, data of the maximum value MAX and the minimum value MIN of each block, from detector 145, are supplied to a substraction circuit 149 which serves as a dynamic range detector, wherein a dynamic range DR (i.e. DR=MAX-MIN) in each block is detected and supplied to adaptive encoder 148. At the encoder 148, the allocated bit number for the block is selected depending on the dynamic range inputted and the difference pixel datum ΔDATA (from the subtraction circuit 147) is quantized once again into a bit number less than the original eight bits, for example, a datum BPL which is compressed into two bits.

The output datum thus obtained, from adaptive encoder 148, is sent to a selector 150. A datum is produced at the selector 150, by a selection signal SEL from a selection signal generator 151, whereby the bit numbers for horizontally and vertically adjacent pixels are different, for example, two bits and one bit, respectively. A clock signal CLK1 is fed to the selection signal generator 151 through terminal 143. Information on the start of a horizontal interval used in the block segmentation, and the separation in the horizontal and vertical directions are also supplied to selection sigal generator 151 through the block segmentation circuit 144. The selection sigal SEL is developed in selection signal generator 151 in accordance with such information.

The two-bit pixel datum and one-bit pixel datum, the dynamic range DR in the block, and the minimum value MIN in the block are all fed to a frame segmentation circuit 152. The selection signal SEL from the circuit 151 is also supplied to the circuit 152 and subjected to frame segmentation. The datum from the frame segmentation circuit 152 is transmitted via the output terminal 153.

A circuit for converting ΔDATA into the two-bit output datum BPL (for example, a ROM) and a circuit for converting Δdata into a bit one-bit output datum BPL (for example, a ROM) may be provided at the adaptive encoder 148, so that the outputs BPL of these circuits may be selectively ouputted by the selection signal SEL. In such case, the selector 150 becomes unnecessary and, in its stead, a selector for selecting one of said two circuits should be provided at the output of the encoder 148. Besides the datum BPL, the dynamic range DR and the maximum value MAX in the block, or the minimum value MIN in the block and said maximum value MAX may be additional codes to be transmitted.

Figure 16:
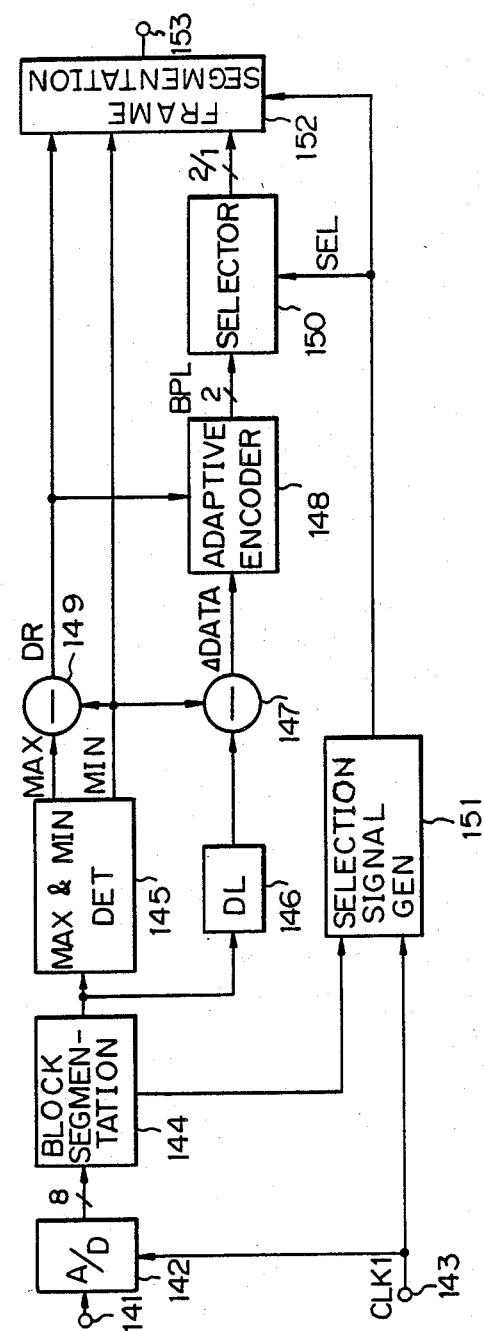
FIG. 16 is a block diagram of a coding apparatus according to the improved spatial sub-sampling coding combined with ADRC.
Figure 17:
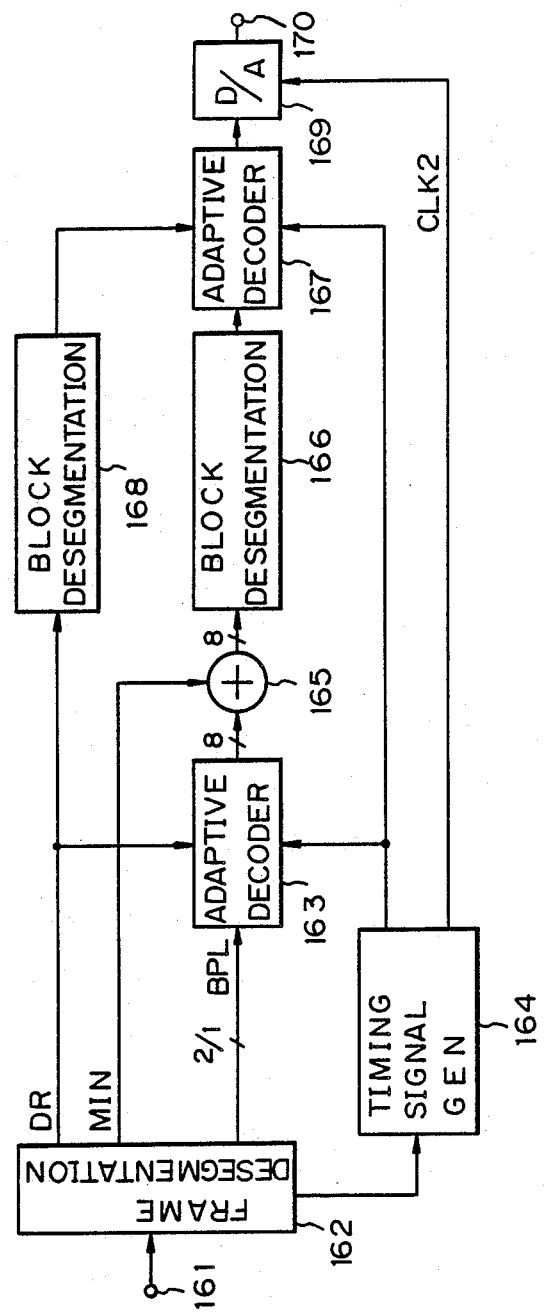
FIG. 17 is a block diagram illustrating a decoding apparatus according to a fourth embodiment of the present invention.

A fourth embodiment of the invention is illustated in FIG. 17, applied to a reception apparatus for receiving data from the encoder shown in FIG. 16.

The transmitted data is fed to a frame desegmentation circuit 162 through an input terminal 161. Picture data from the circuit 162 are supplied to an adaptive decoder 163. The transmitted dynamic range DR in the block is also fed to the decoder 163 from the circuit 162. The allocated bit number (BITS), which is dependent on the dynamic range DR, is obtained at the adaptive decoder 163 in order that adaptive decoding can be effected using this information (BITS).

The minimum value MIN in the block is supplied from the frame desegmentation circuit 162 to an adder 165.

In this case, means I (for instance, a ROM) for adaptively decoding a two-bit datum and means II (for example, a ROM) for adaptively decoding a one-bit datum are provided at the adaptive decoder 163. The allocated bit number (BITS) for means I and II are, for example, two bits and one bit, respectively.

A signal associated with the selection signal of selection circuit 150 in the transmission or encoding apparatus of FIG. 16 is fed from the circuit 162 to a timing signal generator 164. At the generator 164, a selection control signal is developed in synchronism with the transmitted two-bit and one-bit pixel data. The control signal, from generator 164, is fed to the decoder 163 to select means I or II. Consequently, the two-bit pixel dataum and the one-bit pixel datum produce an eight-bit difference datum ΔDATA* at the adaptive decoder 163. The ΔDATA* is fed to the adder 165 so as to provide a decoded pixel datum DATA*. Since the decoded pixel datum is a datum for each block, block desegmentation is performed at a block desegmentation circuit 166 so that said pixel datum is returned to the pixel datum of its original sequence.

A digital video signal from the circuit 166 is supplied to an adjacent-pixel-adaptive decoder 167. The dynamic range DR in a block is supplied from the frame desegmentation circuit 162 to the block desegmentation circuit 168 in order for the dynamic range DR to be adjusted to the time sequence of the digital video signal. In other words, for each pixel data, a dynamic range DR of the block to which it belongs is given. The dynamic range DR from the circuit 168 is fed to the decoder 167 which corrects a pixel datum sent with two bits and referring to pixel data sent with one bit and lying in its vicinity as will be mentioned later.

Also, in this example, the pixel datum sent with one bit is corrected referring to the pixel data in its neighborhood as also mentioned later.

To ensure that the correction processing of the two-bit pixel datum or the one-bit pixel datum is in synchronism with the input pixel data of the adjacent-pixel-adaptive decoder 167, the conversion control signal from the timing signal generator 164 is supplied to the decoder 167.

Each correction value from the decoder 167 is fed to a D/A converter 169 and converted into its original analog signal in response to the clock signal CLK2 from the timing signal generator 164. Such analog signal is derived at an output terminal 170.

Figure 18A:
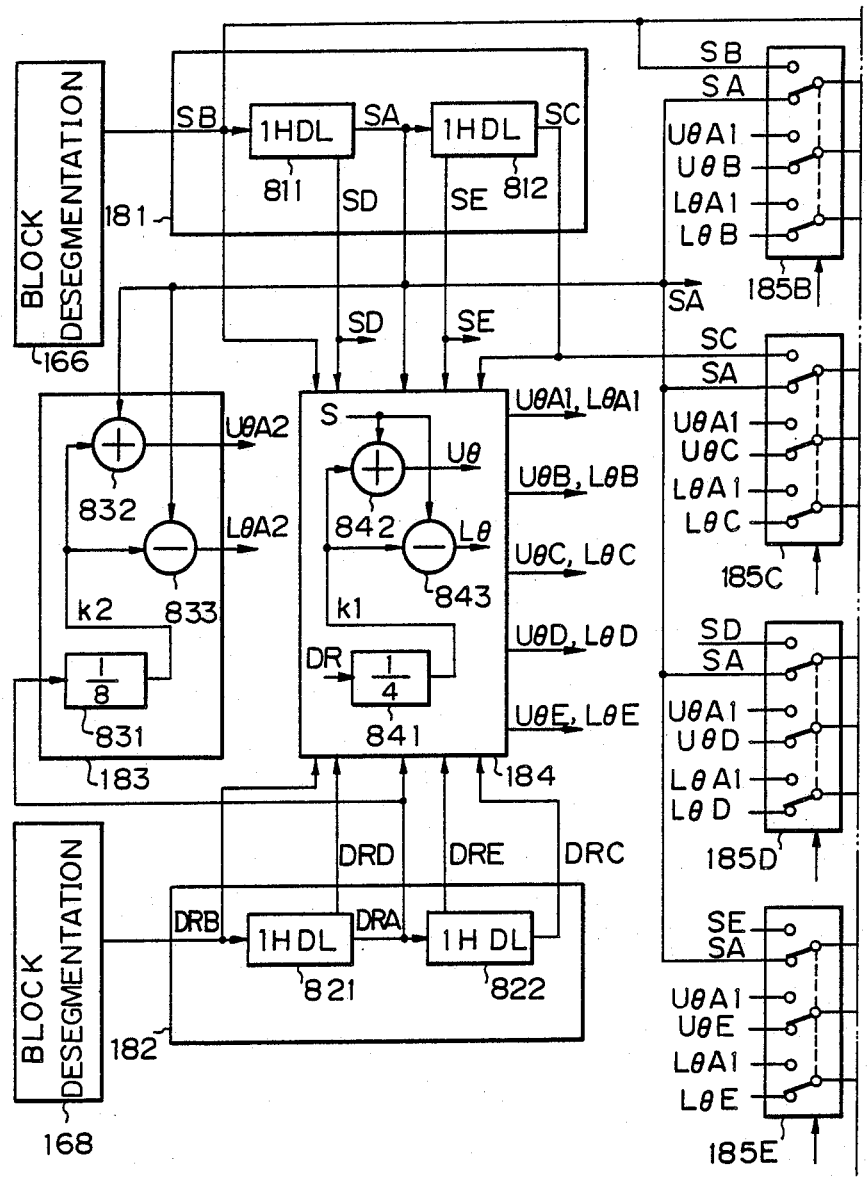
FIGS. 18A and 18B together constitute a block diagram of one example of an adaptive adjacent sample data decoding circuit shown in FIG. 17.
Figure 18B:
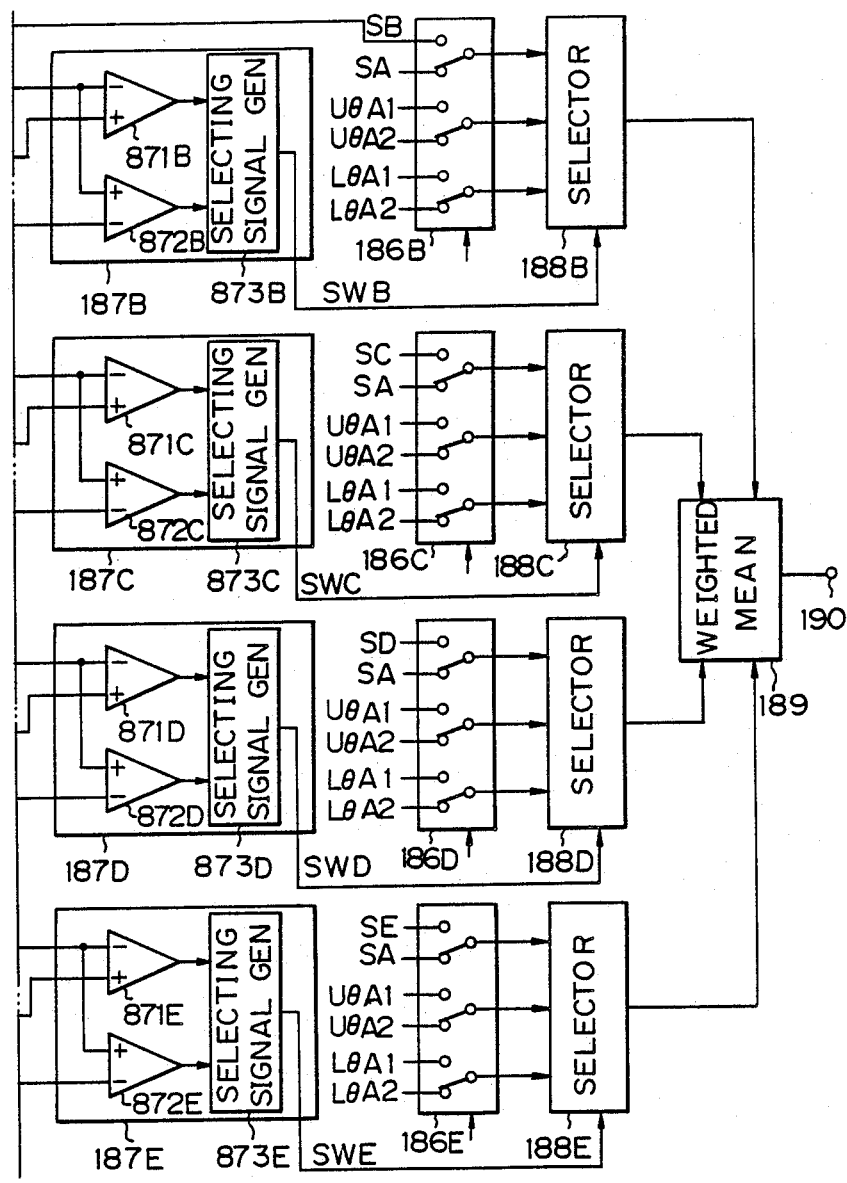

FIGS. 18A and 18B show an example of the above-mentioned adjacent-pixel-adaptive decoder 167, whose operation will be described with reference to FIGS. 19 to 21.

Referring to FIG. 18A, a pixel datum (eight bits) from the block desegmentation circuit 166 is supplied to an extracting circuit 181 for peripheral pixel data. The circuit 181 is made up of serially coupled delay circuits, 811 and 812, each consisting of a memory corresponding to one line of pixel data. In this case, consider as a reference the pixel position of an output pixel datum SA from the delay circuit 811, then an input pixel datum SB to delay circuit 811 is a datum of the pixel lying just above the datum SA; an output pixel datum SC from delay circuit 812 is a datum of the pixel lying just below the datum SA; an output datum SD from the delay circuit 811 is data of the pixel adjacent, in the left-handed direction, to the pixel corresponding to the datum SA; and a pixel datum SE from the delay circuit 812 is a datum of the pixel adjacent, in the right-handed direction, to the pixel corresponding to the datum SA.

The dynamic range DR in each of the divided blocks from the block desegmentation circuit 168, for each pixel datum, is supplied to an adaptive dynamic range generator 182. The generator 182 is constituted by a series connection of delay circuits 821 and 822 each consisting of one line of memory. The output datum of delay circuit 821, that is, the dynamic range DRA which corresponds to the pixel datum SA, is provided from the generator 182. A dynamic range DRB, corresponding to the pixel datum SB, is the input datum to delay circuit 821 of generator 182. Similarly, there are provided dynamic range DRC, corresponding to the pixel datum SC, is provided as the output datum of the delay circuit 822; and a dynamic range DRD, corresponding to the pixel datum SD, is generated as the output datum of the pixel which is one pixel after the output datum of the delay circuit 821; and as the output datum of the pixel which is one pixel prior to that corresponding to the input datum to delay circuit 822, a dynamic range DRE corresponding to the pixel datum SE.

The pixel datum SA, from the extracting circuit 181, and the adaptive dynamic range DRA, from circuit 182 are fed to an upper limit/lower limit generator 183 which provides an upper limit $U\theta A2$ and a lower limit $L\theta A2$ in the range of quantization levels when the pixel datum SA is a two-BIT pixel datum, as shown by 0 in FIG. 19.

Figure 19A:
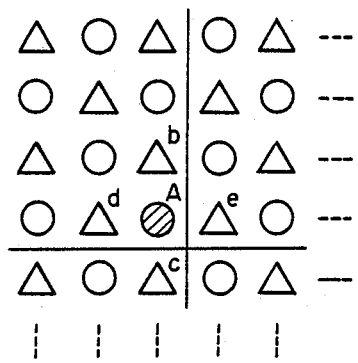
FIGS. 19, 20 and 21 are schematic diagrams for explaining the operation of the embodiment of FIG. 17.
Figure 19B:
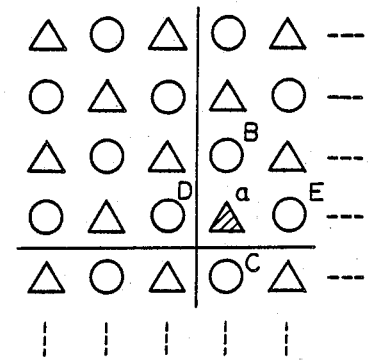

In addition, an upper limit/lower limit generator 184 provides the upper limits $U\theta A1$, $U\theta B$, $U\theta C$, $U\theta D$ and $U\theta E$ of the respective quantization level ranges of the pixel data SA, SB, SC, SD and SE and the lower limits $L\theta A1$, $L\theta B$, $L\theta C$, $L\theta D$ and $L\theta E$ of said ranges when the data are one-bit pixel data as shown by Δ in FIGS. 19A and 19B. The pixel data SA, SB, SC, SD and SE, from circuit 181, and the adaptive dynamic ranges DRA, DRB, DRC, DRD and DRE from the generator 182 are supplied to the generator 184.

The development of the upper and lower limits, in the case of the datum BPL encoded by the non-edge matching technique, will now be described.

Figure 20:
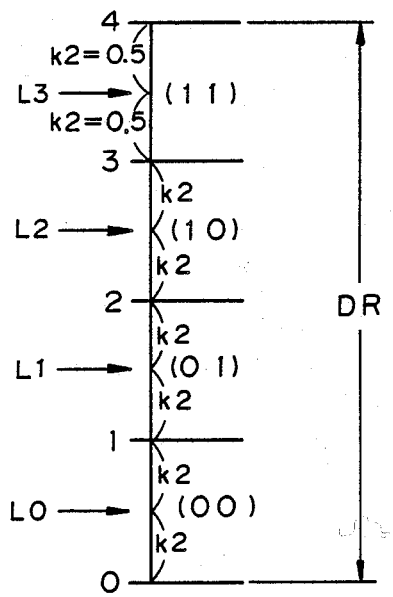

FIG. 20 shows the case of BITS=2 in the non-edge matching technique. FIG. 21 shows the case of BITS=1 and MIN=0, MAX=4, using the same technique.

Figure 21:
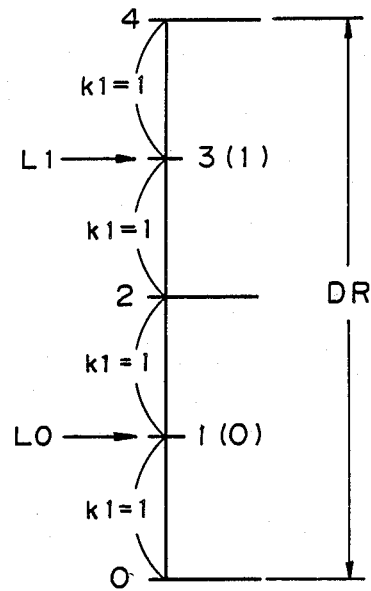

As seen from FIGS. 20 and 21, since decoded values L0, L1, L2 and L3 are the central values of the respective quantization level ranges, the upper limits and the lower limits become the values equal to an addition or subtraction of the decoded value of its pixel and (where $k = DR \times \frac{1}{2}x$, in which x is a division number of the dynamic range DR or, $k = DR \times \frac{1}{2}^{BITS+1}$).

In the generator 183, the dynamic range DRA, from delay circuit 821 corresponding to the two-bit pixel datum SA, is fed to an arithmetic circuit 831 to execute a calculation of $DRA \times \frac{1}{8}$ and provide a value k2. The value k2 is supplied to an adder 832 and a subtraction circuit 833. Meanwhile, the pixel datum SA, which is decoded value from the extraction circuit 181, is fed to the adder 832 and subtraction circuit 833. Therefore, the upper limit $U\theta A2$ of the quantization level range of the datum SA is output from the adder 832, while its lower limit $L\theta A2$ is output from the subtraction circuit 833.

In generator 184, there are provided five circuits each having an arithmetic circuit 841 for dividing by four a corresponding dynamic range from generator 182; and another five circuits each consisting of an adder 842 and a subtraction circuit 843 for performing an addition and a subtraction between an output k1 from the circuit 841 and respective pixel data corresponding to the pixel data SA, SB, SC, SD and SE, from the circuit 181. Said two circuit groups produce the upper limits U$\theta$A1, U$\theta$B, U$\theta$C, U$\theta$D and U$\theta$E and the lower limits L$\theta$A1, L$\theta$B, L$\theta$C, L$\theta$D and L$\theta$E, respectively.

Also, in FIGS. 18A and 18B, switching circuits 185B, 185C, 185D and 185E, and switching circuits 186B, 186C, 186D and 186E are shown to be switched in synchronism with pixels indicated by circles and by triangles $\Delta$ in FIG. 19, by a control signal from the timing signal generator 164 (FIG. 17). When the pixel datum SA is a pixel shown by a circle, the switching circuits are in the illustrated state; whereas, when the datum is a pixel shown by a triangle $\Delta$, the switching circuits are charged-over to a state which is the reverse of that shown in the drawing. Switching circuits 185B to 185E and 186B to 186E provide pixel data and information on the upper and lower limits.

Specifically, in the switching state shown in the drawing (FIGS. 18A and 18B), the switching circuits 185B, 185C, 185D and 185E provide the pixel datum SA; the upper limits U$\theta$B, U$\theta$C, U$\theta$D, and U$\theta$E; and the lower limits L$\theta$B, L$\theta$C, L$\theta$D and L$\theta$E, respectively.

Likewise, the switching circuits 186B, 186C, 186D and 186E give pixel datum SA and the upper limit U$\theta$A2 and the lower limit L$\theta$A2, respectively.

In the opposite switched state from that shown in the drawing, the switching circuits 185B, 185C, 185D and 185E provide the pixel data SB, SC, SD and SE; the upper limit U$\theta$A1; and the lower limit L$\theta$A1, respectively.

In addition, the switching circuits 186B, 186C, 186D and 186E give the pixel data SB, SC, SD and SE; the upper limit U$\theta$A1; and the lower limit L$\theta$A1, respectively.

Decision circuits 187B, 187C, 187D and 187E are made up of comparators 871B, 871C, 871D and 871E for comparing the outputs of the switching circuits 185B, 185C, 185D and 185E and information concerning the upper limits; comparators 872B, 872C, 872D and 872E for comparing said outputs of the circuits 185B to 185E and information concerning the lower limits; and selection signal generators 873B, 873C, 873D and 873E for generating selection signals SWB, SWC, SWD and SWE for selectors 188B, 188C, 188D and 188E, which will be mentioned later, in response to the outputs of the above-mentioned comparators.

The selectors 188B, 188C, 188D and 188E select one of three data (i.e., a pixel datum, an upper limit or a lower limit supplied from switching circuits 186B, 186C, 186D and 186E), based on the selection signals provided by the decision circuits 187B, 187C, 187D and 187E and send the selected one datum to a weighted mean circuit 189.

The weighted mean circuit 189 performs the weighing of the outputs of the selectors 188B, 188C, 188D and 188E; calculates the mean value of the weighted values; and provides the mean value to an output terminal 190 as a correction pixel datum.

Next, an adaptive decoding operation using the above-mentioned adjacent pixel adaptive decoder will be explained.

First, a description will be given for the case where a two-bit pixel datum, as indicated by a circle in FIG. 19, is corrected by referring to a one-bit pixel data as indicated by triangles $\Delta$.

More specifically, in the described example, the decoded value of a pixel A (at the cross-hatched circle position in FIG. 19A) sent with two bits is corrected with pixels b, c, d and e which are disposed in its vicinity and sent with one bit (as indicated by triangles $\Delta$). The thin line in FIG. 19 represents a block dividing line, that is in FIG. 19A, the pixels A, b and d belong to the same block, whereas pixels e and c belong to other respective blocks.

Now consider that pixel datum SA, from the extracting circuit 181 (FIG. 18A) is a two-bit pixel A as shown by a circle in FIG. 19A. In this case, the pixel data SB, SC, SD and SE become the one-bit pixels b, c, d and e as shown by the triangles. For convenience of explanation, it is assumed that these are pixel data Sb, Sc, Sd and Se.

In this state, the switching circuits 185B, 185C, 185D and 185E; and the switching circuits 186B, 186C, 186D and 186E are switched into the state shown in the drawing.

As a result, in decision circuit 187B, the reception pixel data Sa is compared with the upper limit U$\theta$B of quantization level range of the datum Sb of the pixel b and with the lower limit L$\theta$B of said range in the comparators 871B and 872B, respectively, and decisions are made on: whether the pixel datum SA lies in the quantization level range; whether it is larger than the upper limit U$\theta$B; and whether it is smaller than the lower limit L$\theta$B. On the basis of said decisions, the selection signal SWB is obtained from the selection signal generator 873B. The reception pixel datum SA is directly supplied from the selector 188B in response to selection signal SWB when the datum SA lies in the quantization level range of the datum Sb. When the datum SA is larger than the upper limit U$\theta$B, the upper limit U$\theta$A2 of the quantization level range of the reception pixel datum SA is provided from the selector 188B; while the lower limit of said range of the datum SA is obtained when the datum SA is smaller than the lower limit L$\theta$B.

When the reception pixel datum SA lies outside of the quantization level range of the pixel datum Sb, the upper limit U$\theta$A2 or the lower limit L$\theta$A2 of the quantization level range of the datum SA is provided is considered that a correction value of the pixel b, in the vicinity of the datum SA, lies in the quantization level range of the datum SA.

Similarly, at the decision circuits 187C, 187D and 187E, the reception pixel datum SA is compared with the upper limits U$\theta$C, U$\theta$D and U$\theta$E of the quantization level ranges of the data Sc, Sd and Se of the pixels c, d and e and their lower limits L$\theta$C, L$\theta$D and L$\theta$E, and decisions are made on: whether the datum SA lies in the quantization level ranges of the data Sc, Sd and Se; whether it is larger than the upper limits U$\theta$C, U$\theta$D and U$\theta$E; and whether it is smaller than the lower limits L$\theta$C, L$\theta$D and L$\theta$E. On the basis of such decisions, the selection signals SWC, SWD and SWE are produced. In response to these selection signals, the datum SA is obtained from the selectors 188C, 188D and 188E when the datum SA lies in the quantization level ranges of the data Sc, Sd and Se. When the datum SA is greater than the upper limits UθC, UθD and UθE, the upper limit UθA2 of the quantization level range of the datum SA is obtained; whereas the lower limit LθA2 of the quantization level range of the datum SA is provided when the datum is smaller than the lower limits LθC, LθD and LθE.

A correction pixel datum thus obtained from the selectors 188B, 188C, 188D and 188E is supplied to the weighted mean circuit 189 where a weighted mean is calculated. As a result, a correction value of the pixel datum SA may be derived from the output terminal 190.

Weighing coefficients employed in circuit 189 are selected so that those strong correlation the pixel A (approach 1 with reference to distances between the pixel A and the peripheral pixels b, c, d and e, etc.)

In this case, if the decoded value of the pixel A is L3=3.5 (in FIG. 20) and the decoded values of its peripheral pixels, b, c, d and e are all L1=3 (in FIG. 21), then all the outputs of the selectors 188B, 188C, 188D and 188E assume L3=3.5. As a result, the output of the weighted mean circuit 189 becomes nearly 3.5. If a simple mean is calculated, the correction value is equal to 3.5.

Also, when the decoded value of the pixel A is L3=3.5 in FIG. 20; and the decoded values of the peripheral pixels b, c and d are L1=3 in FIG. 21; and further the decoded value of the pixel e is L0=1 in FIG. 21, then the decoded value L3=3.5 of the pixel A is obtained from each of the selectors 188B, 188C and 188D. The lower limit LθA2=3 of the decoded value L3 in FIG. 20 is obtained from the selector 185E in place of the decoded value 1. Therefore, the correction value of the decoded value of the pixel A is $[(3.5\times 3)+3]/4 = 3.375$.

Next, consider that the output pixel datum of the extracting circuit 181 is a one-bit datum of the pixel a indicated by the cross-hatched Δ in FIG. 19B. In this case, the pixel data SB, SC, SD and SE of the circuit 181 are the two-bit data of the peripheral pixels B, C, D and E in FIG. 19B. For simplicity of explanation, it is assumed that a datum of the pixel a and data of the pixels B, C, D and E are Sa and SB, SC, SD and SE, respectively.

In the above case, the switch circuits 185B, 185C, 185D, 185E and the switch circuits 186B, 186C, 186D, 186E are switched to the reverse of the state shown in the drawing.

As a result, at each of the decision circuits 187B, 187C, 187D and 187E, decisions are made on: whether the levels of the respective input pixel data SB, SC, SD and SE lie within a range W of the quantization level of the pixel datum Sa; whether they are higher than the upper limit UθA1 in the range W; and whether they are lower than the lower limit LθA1 in the range W. On the basis of said decisions, the selection signal generators 873B, 873C, 873D and 873E generate the selection signals SWB, SWC, SWD and SWE, respectively.

The selectors 188B, 188C, 188D and 188E are controlled by the selection signals SWB, SWC, SWD and SWE from the decision circuits 187B, 187C, 187D and 187E. When the levels of the input pixel data SB, SC, SD and SE lie in the range W of the quantization level of the pixel datum Sa, the input pixel data SB, SC, SD and SE are directly obtained from the selectors 188B, 188C, 188D and 188E. Also, when said levels lie out of the range W and are larger than the upper limit UθA1, this limit UθA1 is provided from the selectors 188B, 188C, 188D and 188E, whereas when said levels lie out of the range W and are smaller than the lower limit LθA1, this lower limit LθA1 is provided from the selectors 188B, 188C, 188D and 188E.

The outputs of these selectors are supplied to the weighted mean circuit 189. In a manner similar to that mentioned above, this circuit performs the weighing of the outputs of the selectors 188B, 188C, 188D and 188E produces the average value with consideration being given to the degree of correlation between the pixel a and its neighboring pixels B, C, D and E. In this way, the correction datum of the pixel a is provided from said circuit 189.

In this case, when the decoded value of the pixel a is L1=3 in FIG. 21 and each of the decoded values of its peripheral pixels B, C, D and E is L3=3.5 in FIG. 20, all the outputs of the selectors 188B, 188C, 188D and 188E assume L3. As a result, the output of the weighted mean circuit 189 becomes nearly L3=3.5. With a simple mean the correction value becomes 3.5.

Further, when the decoded value of the pixel a is L1=3 (in FIG. 21); and each of the decoded values of the pixels B, C and D among the peripheral pixels is L3=3.5; and the decoded value of the pixel E is L0=0.5 in FIG. 20, then the selectors 188B, 188C and 188D give the decoded values L3=3.5 directly. The selector 188E provides the lower limit LθA1=2 for the decoded value L1 in FIG. 21, in place of the decoded value 0.5. This is because it is considered that the decoded value of the pixel a exists only in the quantization level range of the decoded value L1 when the decoded value of the pixel a is L1. At this time, the correction value of the decoded value of the pixel a is $(3.5\times 3+2)/4 = 3.125$.

Similarly, when the decoded value of a pixel a is L0=1 as shown in FIG. 21 and when any one of the peripheral pixels B, C, D and E is larger than the upper limit of the decoded value L0, the maximum value existing as decoded values of the pixel a, that is, the upper limit UθA1 of its quantization level range is used in place of the decoded values of the pixels B, C, D and E.

Although the foregoing is directed to the non-edge matching case, the values k2 and k1 can be produced by calculating $DR \times 1/(2^{BITS+1} - 2)$ in the arithmetic circuits 831 and 841 of the upper limit/lower limit generators 183 and 184 in the edge matching case. In that event, if the decoded value is the maximum value MAX or the minimum value MIN, the upper limit and the lower limit are likely to be larger than MAX by k1 or k2 or smaller than MIN by k1 or k2 when the upper limit and lower limit are obtained by an addition or subtraction between said decoded value and k1 or k2. For this reason, the generators 183 and 184 produce said MAX and MIN values as the upper limit and the lower limit when the decoded value is MAX or MIN. At this time, the MIN is provided by the block desegmentation of the minimum value MIN in the block from the frame desegmentation circuit 162, and the MAX is given by the sum of the dynamic range DR subjected to block desegmentation and the minimum value MIN subjected to block desegmentation.

Although data having a large bit number and data having a low bit number are sent in a line-quincux fashion as shown in FIGS. 19A and 19B in the above-mentioned embodiments, they may also be transmitted by periodically switching the data.

Also, the bit number may be changed for successive groups of pixels in place of varying said number for alternating pixels. Further, the bit number of one pixel or plural pixels may by changed for every plural pixels. In addition, three or more kinds of bit numbers may be selectively used instead of the above-mentioned two kinds.

Also, only pixels lying at the upper, lower, left-handed and right-handed portions are referred to as peripheral pixels in the above embodiments. However, when pixels small and large bits are arranged in the diagonal direction, a correction value may be obtained by taking the weighted mean. Even in this case, the weighted mean is calculated by weighing the pixels in the diagonal direction the distances between these pixels and the objective pixel to be corrected.

According to the present embodiment, in the reception of a digital video signal transmitted with well-balanced compression in the space direction and in the level direction, a pixel datum with a large bit number is decoded by referring to pixel data lying in its neighborhood and having small bit numbers. As a result, noises appearing on a picture due to a difference of bit numbers are subdued, thus providing excellent reception of the transmitted picture.

I claim:

1. A decoding apparatus for decoding data transmitted from a coding apparatus, comprising:
    means for generating sample data adjacent to a sample datum to be decoded;
    comparator means for comparing datum corresponding to the sample datum to be decoded and data corresponding to said adjacent sample data and providing respective comparison outputs;
    correcting data generating means supplied with said comparison outputs of said comparator means for generating a correcting datum;
    decoding means for decoding an original datum from said sample datum to be decoded; and
    means for combining said correcting datum with said original datum decoded from the sample datum to be decoded.

2. A decoding apparatus according to claim 1, wherein said data includes digitized video signal data, and said means for generating said adjacent sample data includes line delay means having a delay time equivalent to one line period of the video signal and sample delay means having a delay time equivalent to one sample period.

3. A decoding apparatus according to claim 1, wherein each datum of said data transmitted from the coding apparatus has a smaller number of bits than said original datum.

4. A decoding apparatus according to claim 3, wherein said original sample datum is encoded with first and second bit numbers in an alternate and cyclical fashion.

5. A decoding apparatus according to claim 3, wherein said data transmitted from the coding apparatus is digital video encoded in a block format and includes modified digital video for each block representing a difference between the digital video data and one of the maximum and minimum values of the digital video data in the respective block, and an additional code formed of at least two of said maximum and minimum values and dynamic range information determined by said maximum and minimum values for the respective block; and wherein said means for generating said adjacent sample data generates the latter from the same block as that which contains the sample datum to be decoded, and said decoding means includes adder means for adding said correcting datum and said sample datum to be decoded, a decoder for decoding the output of said adder means and being adaptive to said dynamic range information and mixing means for mixing the output of said decoder and one of said maximum and minimum values.

6. A decoding apparatus according to claim 3, wherein said data transmitted from the coding apparatus is digital video data enclosed in a block format and includes modified digital video for each block representing a difference between the digital video data and one of the maximum and minimum values of the digital video data in the respective block, and an additional code formed of at least two of said maximum and minimum values and dynamic range information determined by said maximum and minimum values for the respective block; and further comprising dynamic range adaptive decoder means for decoding said transmitted data to be adaptive to said dynamic range information, and block separation means.

7. A decoding apparatus according to claim 6, wherein said means for generating said adjacent sample data is supplied with the output of said block separation means, and said decoding means includes an adder for adding the output of said block separation means and said correcting datum.

8. A decoding apparatus according to claim 7, wherein said comparator means compare a sum of the decoded sample datum and a half of a quantized step with the decoded adjacent sample data.

9. A decoding apparatus according to claim 3, wherein said data transmitted from the coding apparatus is constituted by digital video data encoded in a block format allowing compression of the block data representing a group of picture elements, and said coding apparatus includes first detecting means for detecting a maximum value of the digital video data of said picture elements in each block, second detecting means for detecting a minimum value of digital video data of said picture elements in said block, means for generating dynamic range information for each said block from said maximum and minimum values of the respective block, means for generating modified digital video data for each said block as a difference between each of said digital ideo data and one of said maximum and minimum values for respective blocks, encoding means for encoding said modified digital video data using said smaller number of bits less than the number of bits in the original datum, and transmitting means for transmitting the encoded data and an additional code for each of said respective blocks, said additional code being formed of at least two of said maximum value, minimum value, and a signal corresponding to said dynamic range information.

10. A decoding apparatus according to claim 9, wherein said means for generating said adjacent sample data generates said adjacent sample data in a block which is the same as that to which said sample datum to be decoded belongs, and said decoding means includes adder means for adding said correcting datum and said sample datum to be decoded, a decoder for decoding the output of said adder means and being adaptive to said dynamic range information and mixing means for mixing the output of said decoder and one of said maximum and minimum values.

11. A decoding apparatus according to claim 9, further comprising dynamic range adaptive decoder means for decoding said transmitted data to be adaptive to said dynamic range information, and block separation means.

12. A decoding apparatus according to claim 11, wherein said means for generating said adjacent sample data is supplied with the output of said block separation means, and said decoding means includes an adder for adding the output of said block separation means and said correcting datum.

13. A decoding apparatus according to claim 12, wherein said comparator means compares a sum of the decoded sample datum and a half of a quantized step with the decoded adjacent sample data.

* * * * *